United States Patent [19]

Hatter et al.

[11] Patent Number: 5,397,557
[45] Date of Patent: Mar. 14, 1995

[54] TETRATHIOCARBONATE BATCH PROCESS

[75] Inventors: Marjorie M. Hatter, Fullerton; Charles F. Wong, Yorba Linda, both of Calif.

[73] Assignee: Union Oil Company of California, Los Angeles, Calif.

[21] Appl. No.: 74,988

[22] Filed: Jun. 10, 1993

Related U.S. Application Data

[63] Continuation of Ser. No. 784,113, Aug. 30, 1991, abandoned, which is a continuation of Ser. No. 415,874, Oct. 2, 1989, abandoned.

[51] Int. Cl.⁶ .............................................. G01B 31/26
[52] U.S. Cl. .................................................... 423/414
[58] Field of Search .......................... 423/414, 511, 562

[56] References Cited

U.S. PATENT DOCUMENTS 4,726,144  2/1988  Young et al. ...................... 405/128

OTHER PUBLICATIONS

"Mass Transfer Operations", by R. E. Treybal, 2nd edition 1968 (no month) pp. 413–414.
Journal of the Chemical Society, 1921, vol. 119, pp. 38–54, Yeoman: Trithiocarbonates and Perthiocarbonates. III. Trithiocarbonates and Perthiocarbonates (no month).
Journal of the Chemical Society, vol. 89 (II), 1906, pp. 1812–1818, (no month) O'Donoghue and Kahan: CLXXIV. Thiocarbonic Acid and Some of its Salts.
Journal of Chemical Society, vol. 128(II), 1928, pp. 2326–2332, Mills and Robinson: Ammonium Polysulphides. CCCVI–Ammonium Polysulphides, Hydrogen Pentasulphide, and the Thiocarbonic Acids (no month).
Topics in Sulfur Chemistry, vol. 2, "Carbon Sulfides and Their Inorganic and Complex Chemistry", by G. Gattow and W. Behrendt, Georg Thieme Publishers Stuttgart 1977, pp. 154–178 (no month).

*Primary Examiner*—Wayne Langel
*Assistant Examiner*—Stuart L. Hendrickson
*Attorney, Agent, or Firm*—Gregory F. Wirzbicki; Shlomo R. Frieman

[57] ABSTRACT

Salts of tetrathiocarbonic acid are produced by a batch process in which a hydroxide, hydrogen sulfide, sulfur and carbon disulfide are reacted sequentially. The salts are produced as aqueous solutions having concentrations of upwards of 30 percent by weight.

20 Claims, No Drawings

TETRATHIOCARBONATE BATCH PROCESS

This application is a continuation of application Ser. No. 07/784,113, filed Aug. 30, 1991, now abandoned which is a continuation of application Ser. No. 07/415,874, filed Oct. 2, 1989, now abandoned.

FIELD OF THE INVENTION

This invention relates to the manufacture of salts of tetrathiocarbonic acid. In one of its more particular aspects this invention relates to a batch process for manufacturing aqueous solutions of tetrathiocarbonates on a commercial scale.

BACKGROUND OF THE INVENTION

The chemistry of thiocarbonic acids and their salts has been studied in some detail, as indicated by O'-Donoghue and Kahan, Journal of the Chemical Society, Vol. 89(II), pages 1812–1818 (1906); Yeoman, Journal of the Chemical Society, Vol. 119, pages 38–54 (1921); Mills and Robinson, Journal of the Chemical Society, Vol. 128(II), pages 2326–2332 (1928) and by Stone et al. in U.S. Pat. No. 2,893,835, dated Jul. 7, 1959.

According to O'Donoghue and Kahan, as far back as 1826 derivatives of thiocarbonic acid were prepared by Berzelius, who reacted aqueous solutions of hydrosulfides with carbon disulfide to give unstable solutions which yielded unstable crystalline salts in accordance with the following reaction:

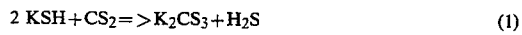

$$2\ KSH + CS_2 => K_2CS_3 + H_2S \qquad (1)$$

Other thiocarbonates were prepared and further characterized by O'Donoghue and Kahan. Their paper, at page 1818, reports the formation of ammonium thiocarbonate by reacting liquid ammonia with cold alcoholic thiocarbonic acid prepared by dropping a solution of calcium thiocarbonate into concentrated hydrochloric acid to produce free thiocarbonic acid ($H_2CS_3$). The calcium thiocarbonate utilized by the authors is described as a double salt, including the calcium cation in combination with both the hydroxide and the trithiocarbonate anions. In addition to free thiocarbonic acid, other compounds prepared by O'Donoghue and Kahan included the sodium, potassium, zinc and lead salts. However, regardless of which of these salts were prepared, a common characteristic was their relative instability, with the prepared compounds breaking down and releasing carbon disulfide and hydrogen sulfide and/or a metal sulfide, often in a matter of minutes.

The noted paper by Yeoman reports a further study of thiocarbonates (called trithiocarbonates therein) and also reports the preparation and properties of perthiocarbonates (or tetrathiocarbonates), derivatives of tetrathiocarbonic acid ($H_2CS_4$). Yeoman reports on methods of preparing the ammonium, alkali metal and alkaline earth metal salts of these acid species. For example, Yeoman prepared ammonium trithiocarbonate by saturating an alcoholic ammonia solution with hydrogen sulfide and then adding carbon disulfide to precipitate the product salt. Ammonium perthiocarbonate was prepared in a similar manner, except that after reacting the ammonia and hydrogen sulfide, elemental sulfur was added to form the disulfide, $(NH_4)_2S_2$; adding carbon disulfide immediately precipitated the product.

Yeoman states that solutions of both ammonium trithiocarbonate and perthiocarbonate are very unstable due both to decomposition to form thiocyanate as a product, and to complete dissociation back into ammonia, hydrogen sulfide and carbon disulfide.

Considerable explanation is provided concerning the stability of thiocarbonates, as exemplified by sodium trithiocarbonate and perthiocarbonate. Sodium trithiocarbonate solutions in water are said to remain stable only if oxygen and carbon dioxide are rigidly excluded; the presence of oxygen causes decomposition to form carbon disulfide and thiosulfates, while carbon dioxide decomposes the solution to form a carbonate, elemental sulfur, carbon disulfide and hydrogen sulfide. Potassium trithiocarbonate behaves similarly, according to Yeoman.

Yeoman also attempted to prepare and characterize the stability of thiocarbonate salts of four of the alkaline earth metals. Yeoman was unable to prepare a pure calcium tri- or tetrathiocarbonate, but did observe that the double salt of calcium trithiocarbonate which he prepared was more stable (probably because it was less hygroscopic) than the sodium or potassium thiocarbonates. The barium salt of tetrathiocarbonic acid could not be isolated, although Yeoman believed it existed in solution. Solid barium trithiocarbonate could not be isolated, although it was alleged to behave like sodium trithiocarbonate when dissolved in water. The preparation of aqueous solutions of the tri- and tetrathiocarbonates of magnesium and strontium was alleged, but the magnesium thiocarbonates were not isolated.

The previously noted paper by Mills and Robinson shows the preparation of ammonium thiocarbonate by digesting ammonium pentasulfide (obtained by suspending sulfur in aqueous ammonia, then saturating with hydrogen sulfide) with carbon disulfide. A crystalline residue from the reaction was found to be ammonium perthiocarbonate. The authors prepared a "better" ammonium perthiocarbonate product, however, by extracting the ammonium pentasulfide with carbon disulfide in a Soxhlet apparatus.

Stone et al. disclose several methods for preparing solid ammonium, alkali and alkaline earth metal salts of tri- and tetraperoxythiocarbonates, hereinafter referred to simply as "tetrathiocarbonates." One such method involves the solution of an active metal such as sodium in anhydrous ethanol to form an ethoxide which, in turn, is reacted with hydrogen sulfide and carbon disulfide to form sodium trithiocarbonate. They report, however, that the trithiocarbonates tend to be quite soluble in ethanol, and if it is desired to recover the solid material from the solution, it is necessary to treat the reaction mixture with a "displacing agent" such as ether, in which case the thiocarbonates frequently separate, not as solids, but as difficultly crystallizable oils which appear to be saturated aqueous solutions of the trithiocarbonate salt. Consequently, such a procedure is not considered feasible for use on a commercial scale. Similar problems were reported with tetrathiocarbonate salts, which were prepared using procedures analogous to those for the trithiocarbonates.

These problems were reportedly solved by carrying out the preparation reaction in a medium which is composed of a major part of a nonsolvent for the reaction components and a minor proportion of a liquid which is miscible with the nonsolvent and which is a solvent, to a measurable degree, for inorganic sulfides. The preferred nonsolvents used were relatively low boiling hydrocarbon materials such as hexane, cyclohexane and benzene. The second solvent was preferably ethanol, isopropanol or dioxane.

Basic physical and chemical properties of these materials and a number of methods for making them are summarized in considerable detail, starting at page 154 in "Carbon Sulfides and their Inorganic and Complex Chemistry" by G. Gattow and W. Behrendt, Volume 2 of "Topics in Sulfur Chemistry", A. Senning, Editor, George Thieme Publishers, Stuttgart, 1977.

What is needed is a process for the manufacture of salts of tetrathiocarbonic acid which is less cumbersome than the processes previously used. Such process should be capable of providing aqueous solutions of tetrathiocarbonates on a commercial scale. The present invention provides such a process.

SUMMARY OF THE INVENTION

The present invention provides a batch process for the production of salts of tetrathiocarbonic acid which is capable of providing aqueous solutions of tetrathiocarbonates in concentrations useful for various commercial applications, such as in the control of nematodes and other soil-borne and water-borne pathogens.

Although it might be expected that hydrogen sulfide and carbon disulfide would react to form trithiocarbonic acid according to the reaction:

$$H_2S + CS_2 => H_2CS_3 \qquad (2)$$

this does not occur. The present invention provides a process which is less cumbersome than prior processes and which can be readily practiced in a simple straightforward manner. According to the process of the present invention, it has been found that tetrathiocarbonates can be produced in concentrations of upwards of 30 percent in water by means of a batch process in which, for example, sodium hydroxide reacts with hydrogen sulfide to produce sodium sulfide in an exothermic reaction; the sodium sulfide thereby produced reacts with elemental sulfur in an endothermic reaction to produce sodium disulfide; and the sodium disulfide thereby produced reacts with carbon disulfide to produce sodium tetrathiocarbonate in an exothermic reaction. The reaction sequence is as follows:

$$2\ NaOH + H_2S => Na_2S + 2\ H_2O \qquad (3)$$

$$Na_2S + S => Na_2S_2 \qquad (4)$$

$$Na_2S_2 + CS_2 => Na_2CS_4 \qquad (5)$$

Adding the reactants shown in Reactions (3), (4) and (5) above sequentially under controlled conditions results in a product which comprises aqueous solutions of tetrathiocarbonates in concentrations of upwards of 30 percent by weight. These tetrathiocarbonate solutions are directly toxic to many plant pathogens, breaking down in soil to release carbon disulfide, which acts as a fumigant. Tetrathiocarbonates are biodegradable, producing sulfates and carbonates, and leave no residue in soil or plants treated with tetrathiocarbonates.

DESCRIPTION OF THE PREFERRED EMBODIMENTS

In the process of the present invention, a hydroxide, hydrogen sulfide, sulfur and carbon disulfide are reacted in approximately stoichiometric quantities in a water medium to produce aqueous tetrathiocarbonate solutions having concentrations of 30 percent by weight or more, preferably concentrations of about 31 percent to about 35 percent by weight.

The description of the invention will proceed using sodium tetrathiocarbonate as an example of the tetrathiocarbonates to which the present invention is directed. It should be understood, however, that other tetrathiocarbonates, such as potassium tetrathiocarbonate, ammonium tetrathiocarbonate, lithium tetrathiocarbonate, calcium tetrathiocarbonate and magnesium tetrathiocarbonate can be similarly prepared by using the corresponding hydroxide.

The process can be conducted in any convenient reaction vessel in which the reactants can be thoroughly mixed and which can be heated or cooled to control the reaction temperature. Pressure is not a major consideration since pressures in the range of about 15–30 psig. are sufficient for the process. Heating and cooling can be provided by either external or internal heat exchangers. A stirred tank reactor, for example, is satisfactory for conducting the process of the present invention.

In order to ensure that the reaction path followed in the batch process of the present invention is the desired path illustrated in Reactions (3), (4) and (5), it is essential that the reactants be introduced into the reactor in the proper order in the proper quantities and at the optimum temperatures for the reactions to proceed as desired. The following description of a typical run outlines the reaction conditions and other considerations which are important in achieving the results desired.

A 6000 gallon stirred tank reactor is flushed with nitrogen to provide an inert atmosphere essentially free of oxygen. The oxygen level is usually less than about 1.0 percent by weight and preferably less than about 0.3 percent by weight. Water is then added to the reactor at a rate of 30,000 lbs./hr. for a period of 46 minutes. Sodium hydroxide is added to the reactor in about a 5 percent to about a 15 percent excess, preferably about a 10 percent excess. The sodium hydroxide is added as a 50 weight percent solution at a rate of 22,500 lbs./hr. for a period of 43 minutes in the first stage of the process. This results in a concentration of about 25 percent by weight. Concentrations of about 10 percent to about 50 percent and preferably about 15 percent to about 35 percent by weight can be used. The sodium hydroxide solution is preferably introduced into the reactor above the liquid surface. During this time the temperature rises by about 40° F.

In the second stage of the process, which is exothermic, hydrogen sulfide is added to the sodium hydroxide solution at a rate of 1,600 lbs./hr. for about 2 hours to provide no more than about a 5 percent excess. The hydrogen sulfide, which is added as a gas, is preferably introduced as near the bottom of the reactor as possible to allow the hydrostatic head of the reactor contents and the agitation to be effective in reacting the hydrogen sulfide with the sodium hydroxide (Reaction 3). An excess of hydrogen sulfide over the 5 percent excess mentioned above should be avoided, since the excess hydrogen sulfide will eventually cause a pressure build-up in the reactor. Typically, hydrogen sulfide gas may have up to about 1–2 percent by weight of inerts, which will simply cause a pressure build-up in the reactor and can be removed by venting. A continuous flow of about 16–33 lbs./hr. to an external scrubber, for example, is sufficient to vent inerts and relieve pressure build-up. Alternatively, pressure build-up due to inerts can be relieved by venting at the end of the hydrogen sulfide addition. The reaction between sodium hydroxide and hydrogen sulfide, as pointed out above, is exothermic. A temperature rise of about 35° F. results.

Since sodium sulfide, which is formed upon the addition of hydrogen sulfide to the diluted sodium hydroxide solution in the second stage of the process, begins to precipitate at temperatures below about 90° F., the reactor should be maintained at a temperature of at least about 110° F. Superatmosphere pressures of about 2.5 psig. to about 10 psig are adequate. The heat produced upon mixing the sodium hydroxide solution with water and the exothermic reaction with hydrogen sulfide is usually sufficient to prevent precipitation of the sodium sulfide product. However, if the temperature of the reactor following the addition of hydrogen sulfide to the sodium hydroxide solution is insufficient to keep sodium sulfide in solution, heat may be added to the reactor by means of a heater or steam jacket to maintain a temperature of about 110° F. Agitation of the reactants is essential during this and succeeding stages.

For beginning the third stage of the process, the addition of sulfur, the temperature should be above about 140° F. to assure reaction of the sulfur with the sodium sulfide. Temperatures of about 140° to about 170° F. are desirable. Sulfur is added in the molten state at a temperature of about 280° F., preferably by spraying into the vapor space above the liquid contents of the reactor. The particle size of the sprayed sulfur particles is preferably less than ⅛ inch in diameter. Contact between molten sulfur droplets and metal surfaces inside the reactor should be avoided. Sulfur is added at a rate of 1,500 lbs./hr. for about 2 hours. The reaction of sulfur with sodium sulfide (Reaction 4) is endothermic, resulting in about a 5° F. temperature drop. It is essential that there be no unreacted sulfur present when carbon disulfide is added in the fourth stage of the process. Since sulfur is extremely soluble in carbon disulfide, any unreacted sulfur will preferentially be held in the carbon disulfide phase rather than being available for reaction with the sodium sulfide in accordance with Reaction 4, thereby reducing the yield of product.

For the reaction between sodium disulfide and carbon disulfide (Reaction 5) to proceed at a reasonable rate, a temperature of about 135°–140° F. has been found optimum. Temperatures of about 120° to about 160° F. can be used. The reactor pressure is typically about 5 psig to about 20 psig, preferably about 10 psig to about 15 psig. Carbon disulfide is added below the surface of the liquid reactor contents at a rate of 2,800 lbs./hr. for about 2.5 hours. The temperature can be maintained at about 135° to about 140° F., with cooling if necessary, since the reaction is exothermic. Venting is undesirable, since the carbon disulfide must be prevented from leaving the reactor in order to insure an optimum yield of sodium tetrathiocarbonate. Consequently, agitation and recirculation of the resulting solution should continue until all the carbon disulfide has reacted, which could take as much as several hours. During the reaction the pressure may rise by about 10 psig to about 20 psig.

The resulting product is an absolutely clear solution, containing neither unreacted sulfur, which would result in a cloudy product, nor unreacted carbon disulfide, which would appear either as a separate phase or as bubbles of cloudiness. The product is orange-red in color and has a slight sulfur odor. The specific formulation described above produces 5000 gallons of 31.8 percent by weight of sodium tetrathiocarbonate in water and has a specific gravity of about 1.20 to about 1.30, typically 1.26 at 70° F. The slight excesses of sodium hydroxide and hydrogen sulfide utilized in the process of the present invention have been found to help hold the active carbon disulfide component more tightly in solution, thereby reducing odor and making the product more stable.

Thus there has been provided a batch process for producing salts of tetrathiocarbonic acid as aqueous solutions having concentrations in the range of about 30 percent by weight to about 35 percent by weight which are relatively stable and yet capable of releasing carbon disulfide under conditions of use.

The invention may be embodied in other forms without departing from the spirit or essential characteristics thereof. For example, as pointed out above, other salts of tetrathiocarbonic acid than sodium tetrathiocarbonate can be prepared using the process of the present invention. Consequently, the present embodiments are to be considered only as being illustrative and not restrictive, with the scope of the invention being indicated by the appended claims. All embodiments which come within the scope and equivalency of the claims are therefore intended to be embraced therein.

We claim:

1. A batch process for producing an aqueous tetrathiocarbonate solution, the process (i) being performed in a reactor under an atmosphere essentially free of oxygen and (ii) comprising the sequential steps of:
   (a) reacting an hydroxide selected from the group consisting of sodium hydroxide, potassium hydroxide, lithium hydroxide, calcium hydroxide, and magnesium hydroxide with a first sulfide in an aqueous solution to produce a second sulfide selected from the group consisting of sodium sulfide, potassium sulfide, lithium sulfide, calcium sulfide, and magnesium sulfide in the aqueous solution,
   (b) reacting the second sulfide with sulfur in the aqueous solution at a temperature of at least about 140° F. to produce a reaction product in the aqueous solution, and
   (c) reacting the reaction product formed in step (b) with carbon disulfide at a temperature of 120° to about 160° F. to produce a tetrathiocarbonate in the aqueous solution, the tetrathiocarbonate being selected from the group consisting of sodium tetrathiocarbonate, potassium tetrathiocarbonate, lithium tetrathiocarbonate, calcium tetrathiocarbonate, and magnesium tetrathiocarbonate,
   wherein about 5 to about 15 percent excess hydroxide is added to the reactor, an excess of the first sulfide is added to the reactor, no unreacted sulfur is present in the aqueous solution at the commencement of step (c), and the sulfur is sprayed into the reactor in a molten state.

2. The process of claim 1 wherein the oxygen level in the inert atmosphere in the reactor is less than about 1.0 percent by weight.

3. The process of claim 1 wherein no more than about 5 percent excess of the first sulfide is added to the reactor.

4. The process of claim 1 wherein the first sulfide is hydrogen sulfide.

5. The process of claim 1 wherein the hydroxide is reacted with the first sulfide at a temperature of about 110° to about 170° F.

6. The process of claim 1 wherein the hydroxide is reacted with the first sulfide at a pressure of about 2.5 to about 10 psig.

7. The process of claim 1 wherein the second sulfide is reacted with the sulfur at a temperature of about 140° to about 170° F.

8. The process of claim 1 wherein the reaction product is reacted with the carbon disulfide at a temperature of about 135° to about 140° F.

9. The process of claim 1 wherein the reaction product is reacted with the carbon disulfide at a pressure of about 5 to about 20 psig.

10. The process of claim 1 wherein the carbon disulfide is added below the surface of the aqueous solution.

11. A batch process for producing an aqueous tetrathiocarbonate solution, the process (i) being performed in a reactor under an inert atmosphere containing less than about 1.0 weight percent oxygen and (ii) comprising the sequential steps of:
(a) reacting an hydroxide selected from the group consisting of sodium hydroxide, potassium hydroxide, lithium hydroxide, calcium hydroxide, and magnesium hydroxide with a first sulfide in an aqueous solution to produce a second sulfide selected from the group consisting of sodium sulfide, potassium sulfide, lithium sulfide, calcium sulfide, and magnesium sulfide in the aqueous solution,
(b) reacting the second sulfide with sulfur in the aqueous solution at a temperature of about 140° to about 170° F. to produce a reaction product in the aqueous solution, and
(c) reacting the reaction product with carbon disulfide at a temperature of 120° to about 160° F. and a pressure of about 5 to about 20 psig to produce a tetrathiocarbonate in the aqueous solution, wherein the tetrathiocarbonate is selected from the group consisting of sodium tetrathiocarbonate, potassium tetrathiocarbonate, lithium tetrathiocarbonate, calcium tetrathiocarbonate and magnesium tetrathiocarbonate; about 5 to about 15 percent excess hydroxide is added to the reactor; an excess of the first sulfide is added to the reactor; the sulfur is sprayed into the reactor (i) as molten sulfur droplets having a particle size less than about ⅛ inch in diameter and (ii) without the molten sulfur droplets contacting the inside surface of the reactor; no unreacted sulfur is present in the aqueous solution at the commencement of step (c); and the carbon disulfide is added below the surface of the aqueous solution.

12. The process of claim 11 wherein the oxygen level in the inert atmosphere in the reactor is less than about 0.8 percent by weight.

13. The process of claim 11 wherein the reaction product is reacted with the carbon disulfide at a temperature of about 135° to about 140° F.

14. The process of claim 1 wherein the reaction product is reacted with the carbon disulfide at a pressure of about 10 to about 15 psig.

15. A batch process for producing an aqueous tetrathiocarbonate solution, the process (i) being performed in a reactor under an inert atmosphere containing less than about 1.0 weight percent oxygen and (ii) comprising the sequential steps of:
(a) reacting an hydroxide selected from the group consisting of sodium hydroxide, potassium hydroxide, lithium hydroxide, calcium hydroxide, and magnesium hydroxide with a first sulfide in an aqueous solution to produce a second sulfide selected from the group consisting of sodium sulfide, potassium sulfide, lithium sulfide, calcium sulfide, and magnesium sulfide in the aqueous solution,
(b) reacting the second sulfide with sulfur in the aqueous solution at a temperature of about 140° to about 170° F. to produce a reaction product in the aqueous solution, and
(c) reacting the reaction product with carbon disulfide at a temperature of about 135° to about 140° F. and a pressure of about 10 to about 15 psig to produce a tetrathiocarbonate in the aqueous solution, wherein the tetrathiocarbonate is selected from the group consisting of sodium tetrathiocarbonate, potassium tetrathiocarbonate, lithium tetrathiocarbonate, calcium tetrathiocarbonate and magnesium tetrathiocarbonate; about 5 to about 15 percent excess hydroxide is added to the reactor; an excess of the first sulfide is added to the reactor; the sulfur is sprayed into the reactor (i) as molten sulfur droplets having a particle size less than about ⅛ inch in diameter and (ii) without the molten sulfur droplets contacting the inside surface of the reactor; no unreacted sulfur is present in the aqueous solution at the commencement of step (c); and the carbon disulfide is added below the surface of the aqueous solution.

16. The process of claim 11 wherein the tetrathiocarbonate comprises sodium tetrathiocarbonate.

17. The process of claim 15 wherein the tetrathiocarbonate comprises sodium tetrathiocarbonate.

18. The process of claim 1 wherein the sulfur is sprayed into the reactor (i) as molten sulfur droplets having a particle size less than about ⅛ inch in diameter and (ii) without the molten sulfur droplets contacting the inside surface of the reactor.

19. The process of claim 11 wherein the reaction product comprises a disulfide selected from the group consisting of sodium disulfide, potassium disulfide, lithium disulfide, calcium disulfide, and magnesium disulfide.

20. The process of claim 15 wherein the reaction product comprises a disulfide selected from the group consisting of sodium disulfide, potassium disulfide, lithium disulfide, calcium disulfide, and magnesium disulfide.

* * * * *